United States Patent
Nostrant

(10) Patent No.: US 9,216,785 B2
(45) Date of Patent: Dec. 22, 2015

(54) SYSTEMS AND METHODS FOR PROVIDING AN IMPROVED BICYCLE STAND

(76) Inventor: Tom Nostrant, Aberdeen, WA (US)

( * ) Notice: Subject to any disclaimer, the term of this patent is extended or adjusted under 35 U.S.C. 154(b) by 184 days.

(21) Appl. No.: 11/970,675

(22) Filed: Jan. 8, 2008

(65) Prior Publication Data

US 2008/0169626 A1 Jul. 17, 2008

Related U.S. Application Data

(60) Provisional application No. 60/884,888, filed on Jan. 14, 2007.

(51) Int. Cl.
*B62H 1/06* (2006.01)
*B62H 3/00* (2006.01)
*B62H 3/02* (2006.01)

(52) U.S. Cl.
CPC ........................................ *B62H 3/02* (2013.01)

(58) Field of Classification Search
CPC .............. B62H 1/00; B62H 1/06; B62H 3/00; B62H 3/02
USPC .......... 211/5, 17; 280/293, 298, 301; 248/188.8; 188/24.18, 24.22; 43/21.2, 43/25
See application file for complete search history.

(56) References Cited

U.S. PATENT DOCUMENTS

| | | | | |
|---|---|---|---|---|
| 456,347 A | * | 7/1891 | Taylor | 280/298 |
| 474,415 A | * | 5/1892 | Schoch | 280/301 |
| 495,914 A | | 4/1893 | Smart | |
| 514,815 A | * | 2/1894 | Davis | 280/296 |
| 535,160 A | * | 3/1895 | Campbell | 280/293 |
| 563,570 A | * | 7/1896 | Covert | 280/298 |
| 563,927 A | * | 7/1896 | Holmes | 280/296 |
| 567,015 A | * | 9/1896 | Lucas | 280/296 |
| 567,035 A | * | 9/1896 | Wells | 280/301 |
| 573,378 A | * | 12/1896 | Woolley | 280/296 |
| 581,107 A | * | 4/1897 | Emery | 280/295 |
| 586,040 A | * | 7/1897 | Judge | 280/293 |
| 602,270 A | * | 4/1898 | Sackett | 211/17 |
| 606,118 A | * | 6/1898 | Bowman | 211/5 |
| 608,543 A | * | 8/1898 | Breithut | 280/296 |
| 611,374 A | * | 9/1898 | Bundick | 280/298 |
| 626,239 A | * | 6/1899 | Lindstrom | 280/301 |
| 653,681 A | * | 7/1900 | Lee | 280/296 |
| 666,249 A | * | 1/1901 | Wood | 280/298 |
| 672,401 A | * | 4/1901 | Axel | 280/298 |
| 747,449 A | * | 12/1903 | Longbottom | 280/293 |
| 850,527 A | * | 4/1907 | Ellis | 280/293 |
| 948,349 A | * | 2/1910 | Settle | 280/298 |

(Continued)

FOREIGN PATENT DOCUMENTS

GB         2243282 A   *   10/1991  .............  A01K 97/00

OTHER PUBLICATIONS http://www.pbwbikes.com/product_info.php/products_id/66, PBW Locking Parking Brake Lever, Dated Oct. 15, 2006 via www.internetarchive.org.*

*Primary Examiner* — Joshua Rodden

(57) ABSTRACT

An improved portable bicycle stand having an elongated rigid member with a stand head and stand foot. The head is shaped so as to positively engage a bicycle frame above its center of gravity. The foot is shaped so as to positively engage a ground surface. The elongated rigid member is formed from a plurality of interlocking tubular segments, which are collapsible for portability.

16 Claims, 12 Drawing Sheets

(56) References Cited

U.S. PATENT DOCUMENTS

| | | | |
|---|---|---|---|
| 1,143,780 A * | 6/1915 | Pinto | 280/298 |
| 1,227,390 A * | 5/1917 | Cook | 280/293 |
| 1,584,096 A | 5/1926 | Henderson | |
| 2,202,426 A | 5/1940 | Pawset | |
| 2,268,051 A | 12/1941 | Miller | |
| 2,702,197 A * | 2/1955 | Sabatino | 280/298 |
| 2,705,015 A * | 3/1955 | Langlais | 52/632 |
| 3,635,233 A * | 1/1972 | Robertson | 135/71 |
| 3,669,133 A * | 6/1972 | Hyman | 135/74 |
| 3,712,637 A * | 1/1973 | Townsend | 280/293 |
| 3,712,640 A * | 1/1973 | Shipman et al. | 280/301 |
| 3,730,544 A * | 5/1973 | Hyman | 280/819 |
| 3,910,603 A * | 10/1975 | Shipman | 280/293 |
| 3,963,037 A * | 6/1976 | Clark | 135/65 |
| 3,980,320 A | 9/1976 | Marchello | |
| 4,556,230 A | 12/1985 | Dickman | |
| 4,563,016 A * | 1/1986 | Holleron, Jr. | 280/293 |
| 4,591,180 A | 5/1986 | Copple | |
| 4,794,770 A * | 1/1989 | Andersson et al. | 70/234 |
| 4,819,957 A * | 4/1989 | Printy | 280/293 |
| 4,869,280 A * | 9/1989 | Ewing | 135/69 |
| 4,971,346 A * | 11/1990 | Fales et al. | 280/293 |
| 4,979,531 A * | 12/1990 | Toor et al. | 135/127 |
| 5,004,399 A * | 4/1991 | Sullivan et al. | 414/729 |
| D317,143 S * | 5/1991 | Weissenberger | D12/120 |
| 5,182,874 A * | 2/1993 | Powell | 43/25 |
| 5,237,769 A * | 8/1993 | Navarro | 43/21.2 |
| 5,291,972 A * | 3/1994 | Griffith | 188/24.18 |
| 5,293,786 A * | 3/1994 | Hsu | 74/564 |
| D350,089 S * | 8/1994 | Greenfield | D12/120 |
| 5,346,238 A * | 9/1994 | Greenfield | 280/293 |
| 5,553,715 A * | 9/1996 | Brotz | 211/5 |
| 5,607,173 A * | 3/1997 | Lai | 280/293 |
| 5,802,889 A * | 9/1998 | Arnold | 70/18 |
| 5,930,932 A * | 8/1999 | Peterson | 42/94 |
| 5,979,269 A * | 11/1999 | Su-Chen | 74/564 |
| 6,168,180 B1 * | 1/2001 | Egloff | 280/293 |
| 6,378,890 B1 * | 4/2002 | Cheng | 280/642 |
| 6,474,664 B1 * | 11/2002 | Luttway et al. | 280/47.38 |
| 6,494,327 B2 * | 12/2002 | Huang | 211/17 |
| 6,494,423 B1 * | 12/2002 | Ruth | 248/188.8 |
| 6,712,377 B1 * | 3/2004 | Meiring | 280/303 |
| 6,964,426 B2 * | 11/2005 | Kuboshima et al. | 280/301 |
| 6,976,593 B2 * | 12/2005 | Fierstein | 211/17 |
| 7,097,191 B2 * | 8/2006 | Griggs | 280/301 |
| 7,188,854 B1 * | 3/2007 | Pickens | 280/293 |
| 7,267,353 B1 * | 9/2007 | Mayhew | 280/293 |
| 7,384,097 B2 * | 6/2008 | Park et al. | 297/45 |
| 7,516,973 B2 * | 4/2009 | Mielke | 280/293 |
| 7,575,207 B2 * | 8/2009 | Chuang | 248/168 |
| 2006/0157625 A1 * | 7/2006 | Griggs | 248/188.8 |
| 2006/0231512 A1 * | 10/2006 | Mielke | 211/17 |
| 2007/0040351 A1 * | 2/2007 | Bozung et al. | 280/293 |
| 2008/0016750 A1 * | 1/2008 | Benton | 43/21.2 |
| 2008/0271962 A1 * | 11/2008 | Kelsen | 188/24.18 |
| 2009/0115211 A1 * | 5/2009 | Johnson | 294/19.1 |

* cited by examiner

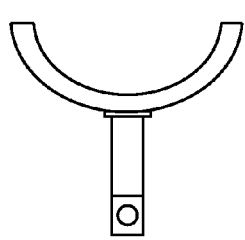
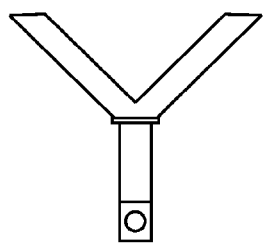
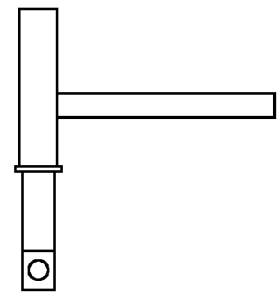
Fig. 7a    Fig. 7b    Fig. 7c
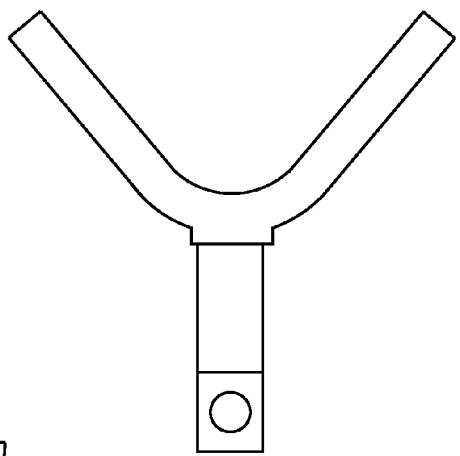
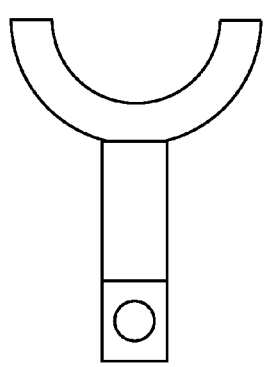
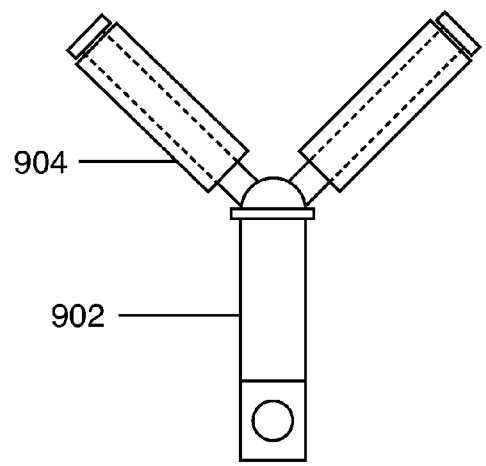
Fig. 8a    Fig. 8b    Fig. 9

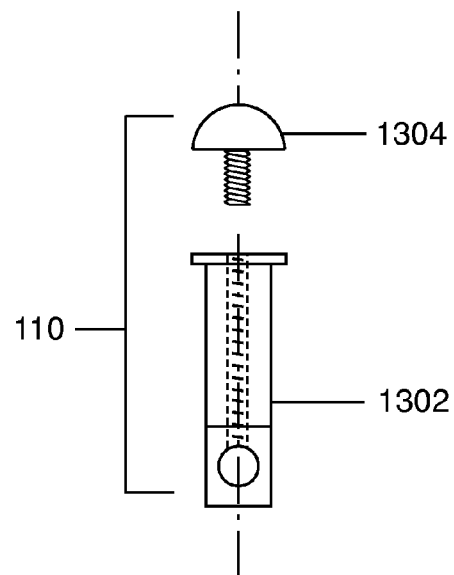
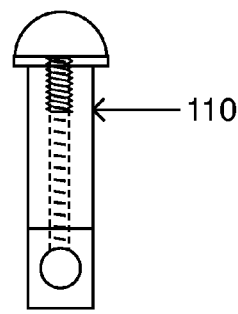
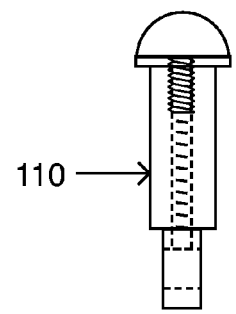
Fig. 13a  Fig. 13b  Fig. 13c
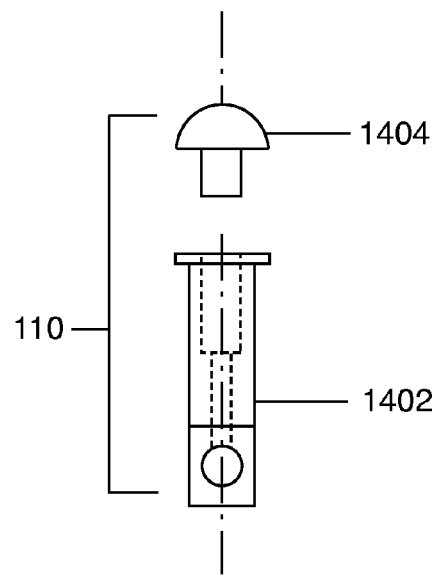
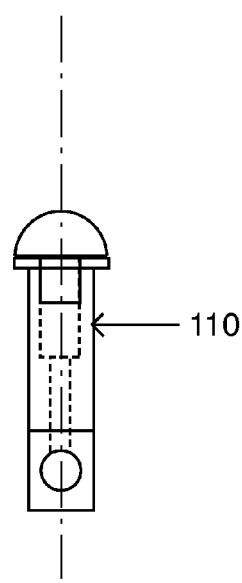
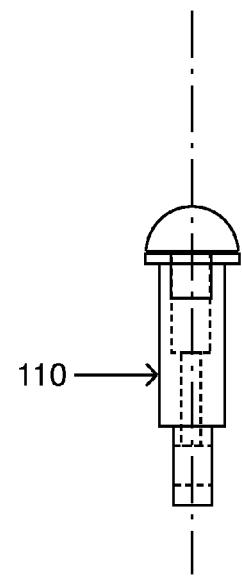
Fig. 14a  Fig. 14b  Fig. 14c

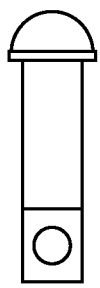
Fig. 15a          Fig. 15b
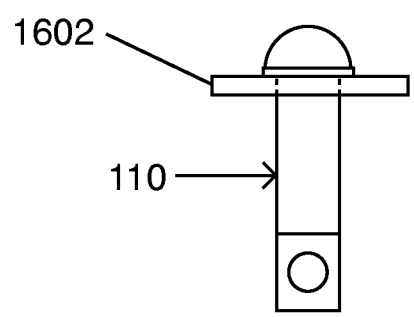
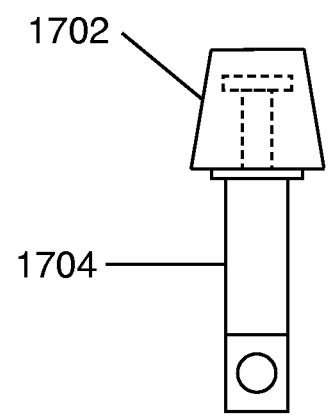
Fig. 16          Fig. 17

SYSTEMS AND METHODS FOR PROVIDING AN IMPROVED BICYCLE STAND

PRIORITY CLAIM

This application claims the benefit of U.S. provisional patent application Ser. No. 60/884,888 filed Jan. 14, 2007. The foregoing application is incorporated by reference in its entirety as if fully set forth herein.

FIELD OF THE INVENTION

This invention relates generally to mechanics and more specifically to an improved portable bicycle stand.

BACKGROUND OF THE INVENTION

Bicycle stands are well known in the art and can generally be divided into two broad categories including stands that place a support leg on both sides of a bicycle to hold the bicycle in a near vertical position when parked on flat ground and stands that place a support leg on one side of a bicycle upon which the bicycle leans.

Examples of prior art bicycle stands that are permanently mounted to a bicycle are evident in both categories. Most mimic a traditional kickstand with a pivoting leg that is disposed vertically for use and horizontally when not needed. Dickmann (U.S. Pat. No. 4,556,230); Hsu (U.S. Pat. No. 5,293,786); Henderson (U.S. Pat. No. 1,584,096); Pawset (U.S. Pat. No. 2,202,426); Weissenberger (U.S. Pat. No. D317,143); Miller (U.S. Pat. No. 2,268,051); and Smart (U.S. Pat. No. 495,914) are examples. The bicycle stands provided in these references suffer from a number of problems, including but not limited to, added weight; a danger of the stand contacting the ground while operating the bicycle; a lack of style that appeals to modern cyclists; and permanence. Accordingly, despite being useful and often desired, most serious bicyclists do not have kickstands on their bicycles and instead lean bicycles against walls or against the ground.

Examples of prior art bicycle stands that are removably coupled to a bicycle are also evident in both categories. References that provide removable support legs for both sides of a bicycle include Townsend (U.S. Pat. No. 3,712,637); Marchello (U.S. Pat. No. 3,980,320); Fierstein (U.S. Pat. No. 6,976,593); and Lee (U.S. Pat. No. 653,681). However, the bicycle stands provided in these references suffer from a number of deficiencies, including but not limited to being overly complicated, difficult to use, large and non-portable, and limited to use on level ground. References that provide a removable support leg for one side of a bicycle include Fales (U.S. Pat. No. 4,971,346); Cook (U.S. Pat. No. 1,227,390); Copple (U.S. Pat. No. 4,591,180); Egloff (U.S. Pat. No. 6,168,180); Shipman (U.S. Pat. No. 3,910,603); Greenfield (U.S. Pat. No. 5,346,238); and Greenfield (U.S. Pat. No. D350,089). However, the bicycle stands provided in these references suffer from a number of deficiencies, including but not limited to supporting a bicycle below its center of gravity, being constructed from heavy and dense materials, being too long for convenient portability, being limited to a fixed angle of support, requiring a mounting structure to be pre-attached to a bicycle, limiting support to one side of a bicycle, requiring stooping or kneeling to operate, and requiring contact with the dirtiest parts of a bicycle.

Accordingly, while desirable results have been achieved, there is room for improvement. What is needed, therefore, is an improved portable bicycle stand.

SUMMARY

This invention relates generally to mechanics and more specifically to an improved portable bicycle stand. In one embodiment, the invention includes a stand for supporting a bicycle in an upright position while not in use, the stand including a plurality of interlocking segments, the plurality of interlocking segments each having an internal channel, the plurality of interlocking segments configurable to being removably coupled to one another at opposing ends to provide an elongated member; a stand head, the stand head configurable to being removably coupled to a first end of the elongated member, the stand head having a concave shape for receiving a bicycle frame; a stand foot, the stand foot configurable to being removably coupled to a second end of the elongated member, the second end being opposite the first end, the stand foot having a post for receiving a ground surface; and an elastic cord, the elastic cord being coupled to the stand head and the stand foot and running through the internal channel of the plurality of interlocking segments, the elastic cord being configurable to provide resistance to hold the elongated member, the stand head, and the stand foot in a rigid position, wherein the elongated member is configurable to provide support between the bicycle frame and the ground surface. In a further embodiment, the stand also includes a circular band, the circular band being constructed from elastic material, the circular band being configurable to elastically depress a brake lever, wherein the circular band can be applied to the brake lever to prevent movement of the bicycle frame while the elongated member is providing support between the bicycle frame and the ground surface. In yet a further embodiment, the stand head receives the bicycle frame at a point above its center of gravity.

BRIEF DESCRIPTION OF THE DRAWINGS

Embodiments of the present invention are described in detail below with reference to the following drawings:

FIGS. 7a to 7c are front views of various shaped stand heads, in accordance with an embodiment of the invention;

FIGS. 8a and 8b are front views of single molded stand heads, in accordance with an embodiment of the invention;

FIG. 9 is a front view of a stand head with padding, in accordance with an embodiment of the invention;

FIGS. 13a-13c are an exploded side view, a side view, and a front view of a stand foot, respectively, in accordance with an embodiment of the invention;

FIGS. 14a-14c are an exploded side view, a side view, and of a front view of a stand foot, in accordance with an embodiment of the invention;

FIGS. 15a and 15b are a side views of a various stand feet, in accordance with an embodiment of the invention;

FIG. 16 is a side view of a stand foot with a shoulder, in accordance with an embodiment of the invention;

FIG. 17 is a side view of a stand foot, in accordance with an embodiment of the invention;

DETAILED DESCRIPTION

This invention relates generally to mechanics and more specifically to an improved portable bicycle stand. Specific details of certain embodiments of the invention are set forth in the following description and in FIGS. 1-22 to provide a thorough understanding of such embodiments. The present invention may have additional embodiments, may be practiced without one or more of the details described for any particular described embodiment, or may have any detail for one embodiment practiced with any other detail for another embodiment.

Figure 1:
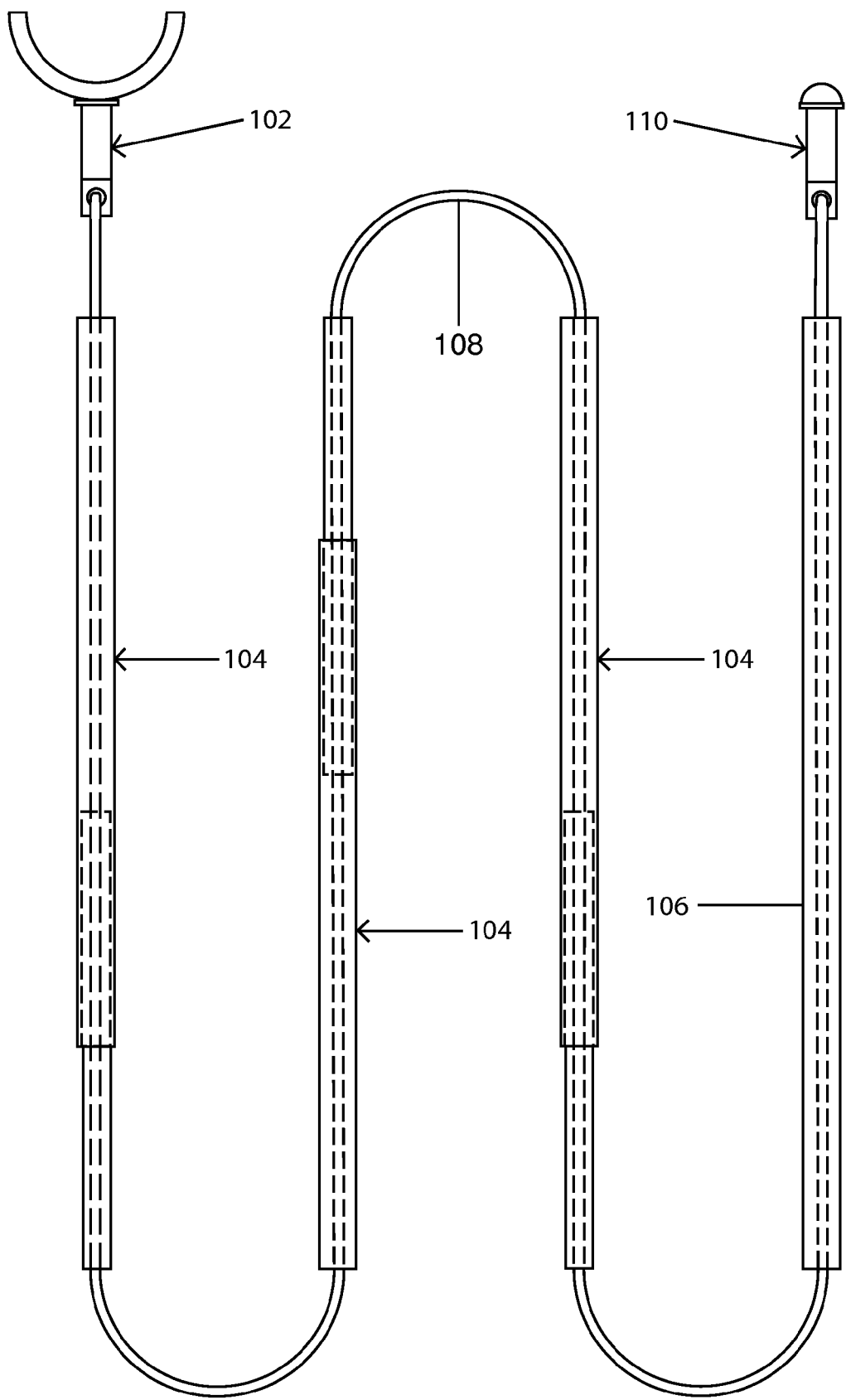
FIG. 1 is a side view of a collapsed stand having a stand head and stand foot, in accordance with an embodiment of the invention.
Figure 2:
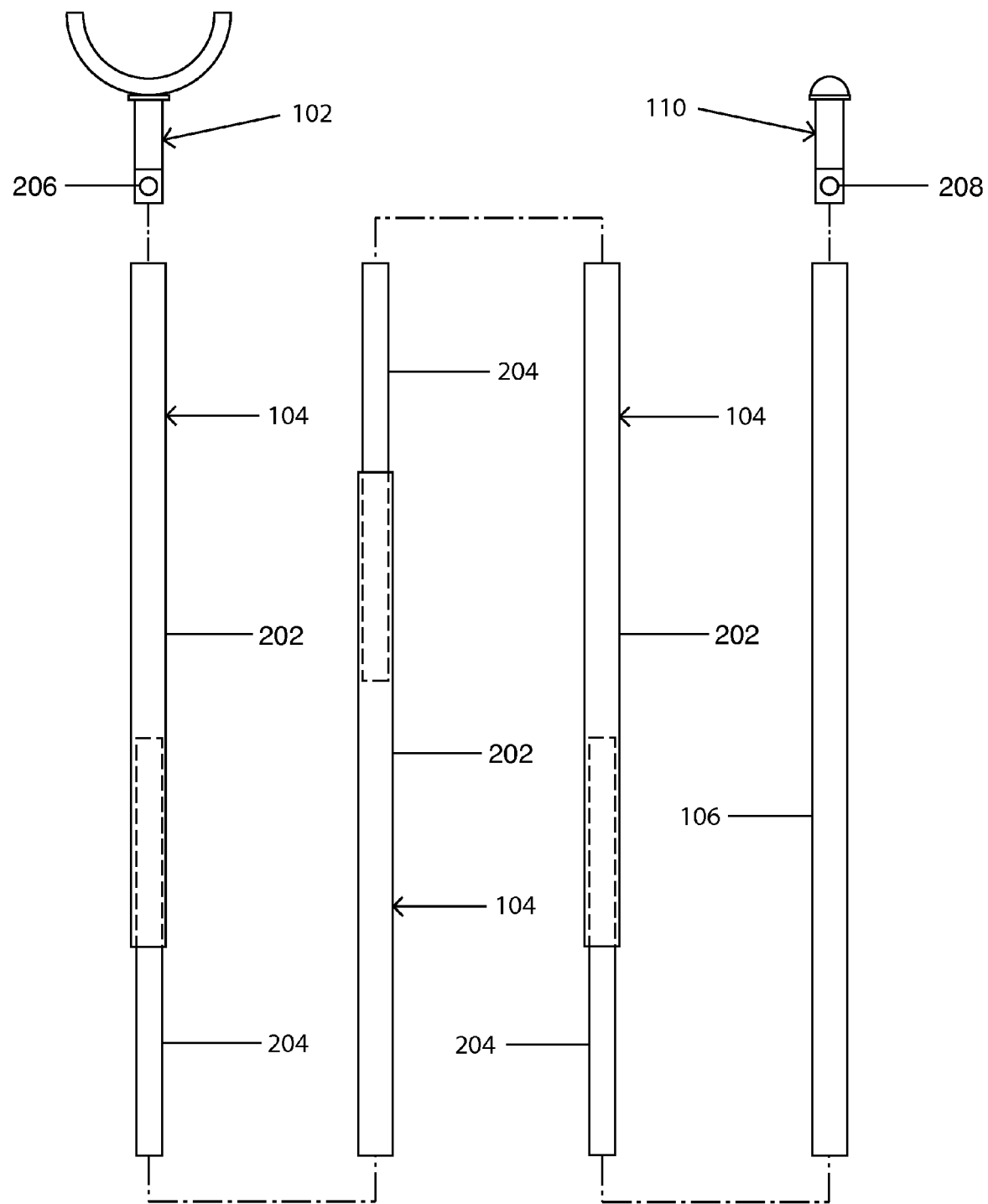
FIG. 2 is a side view of a collapsed stand having a stand head and stand foot, in accordance with an embodiment of the invention.
Figure 10:
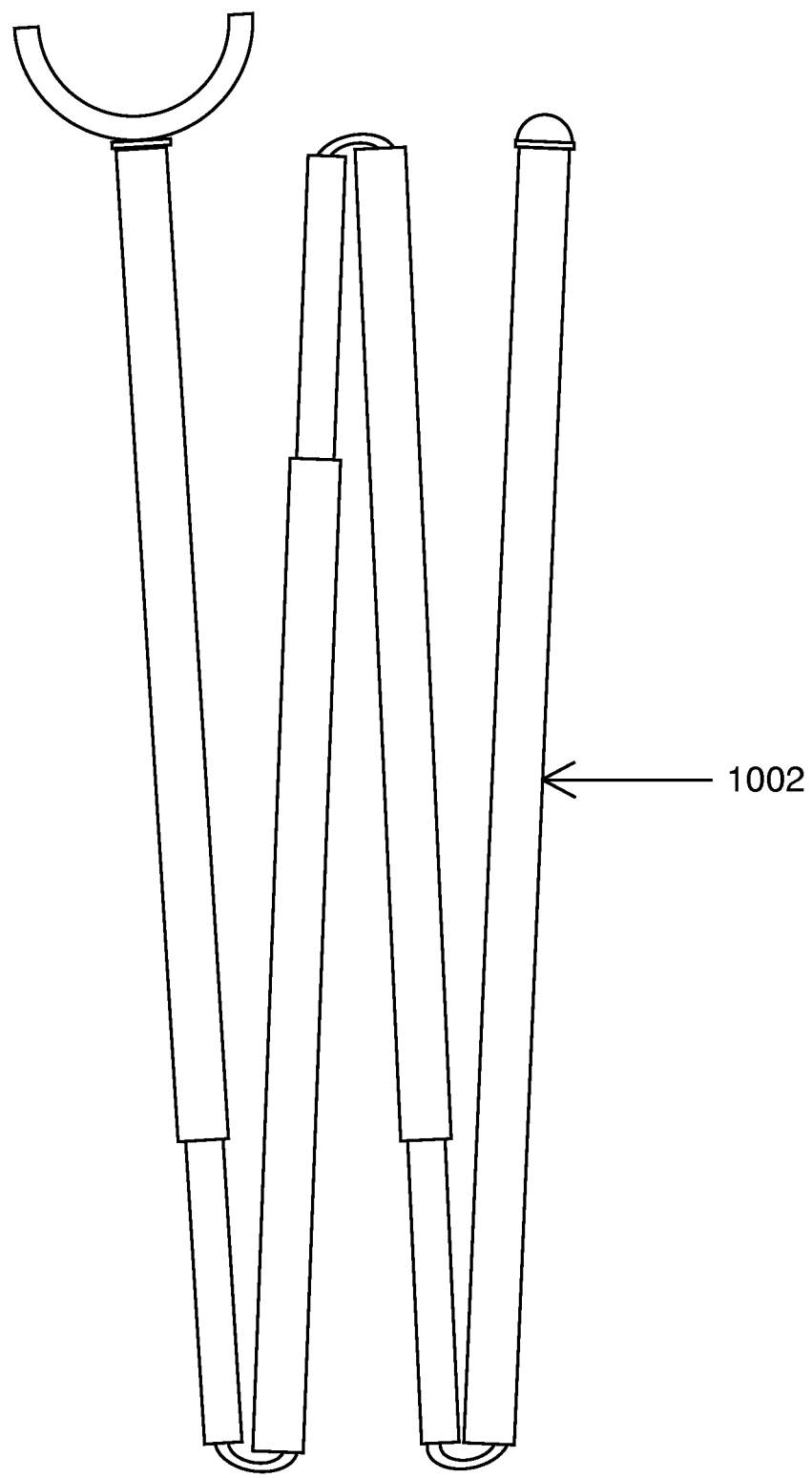
FIGS. 10-12 are side views of various collapsed stands, in accordance with an embodiment of the invention.
Figure 11:
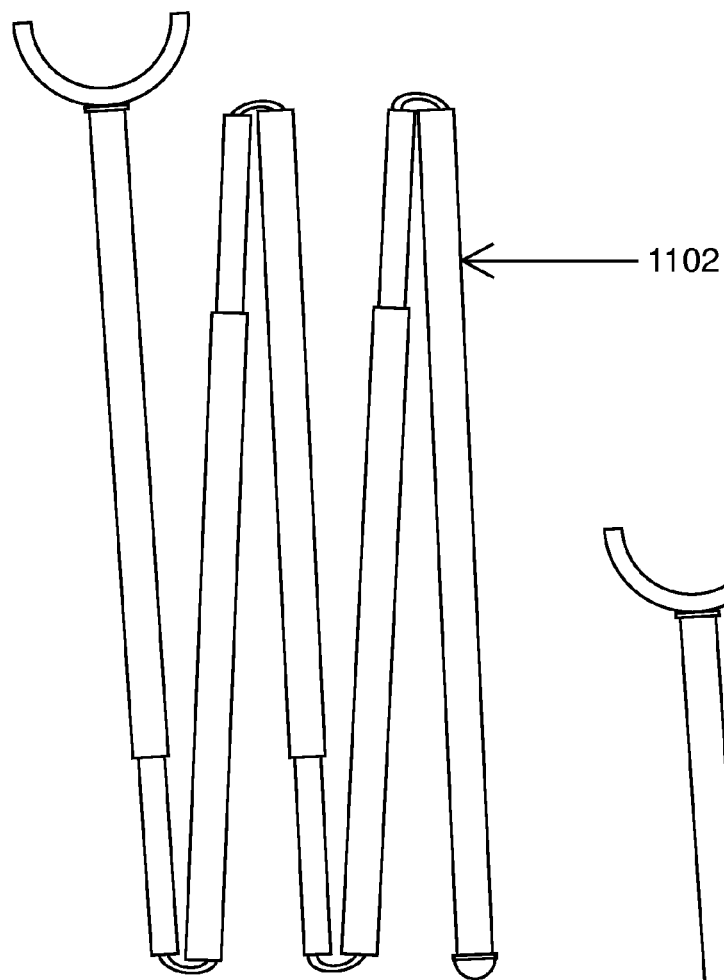
Figure 12:
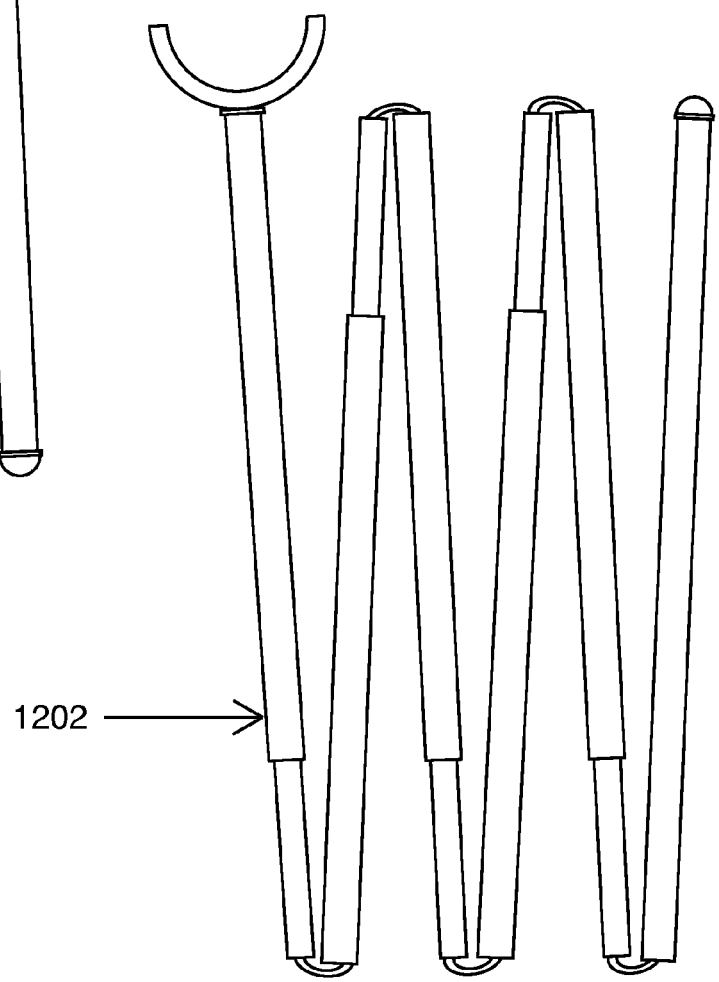
Figure 18:
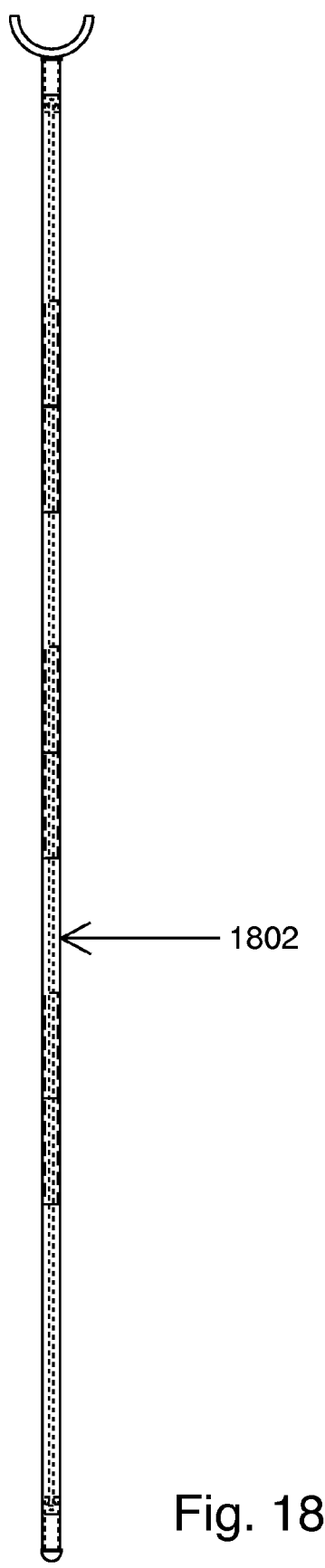
FIGS. 18 and 19 are side views of an extended stand, in accordance with an embodiment of the invention.
Figure 19:
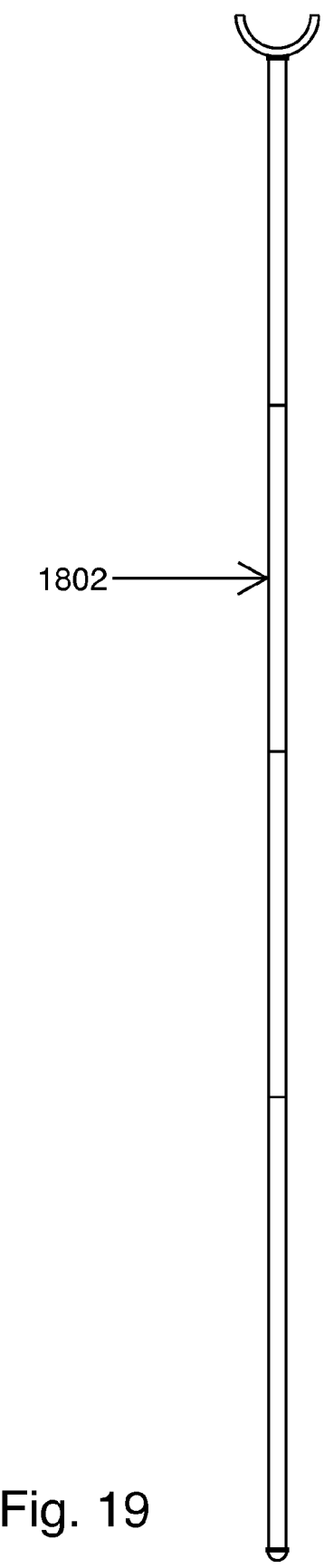
Figure 22:
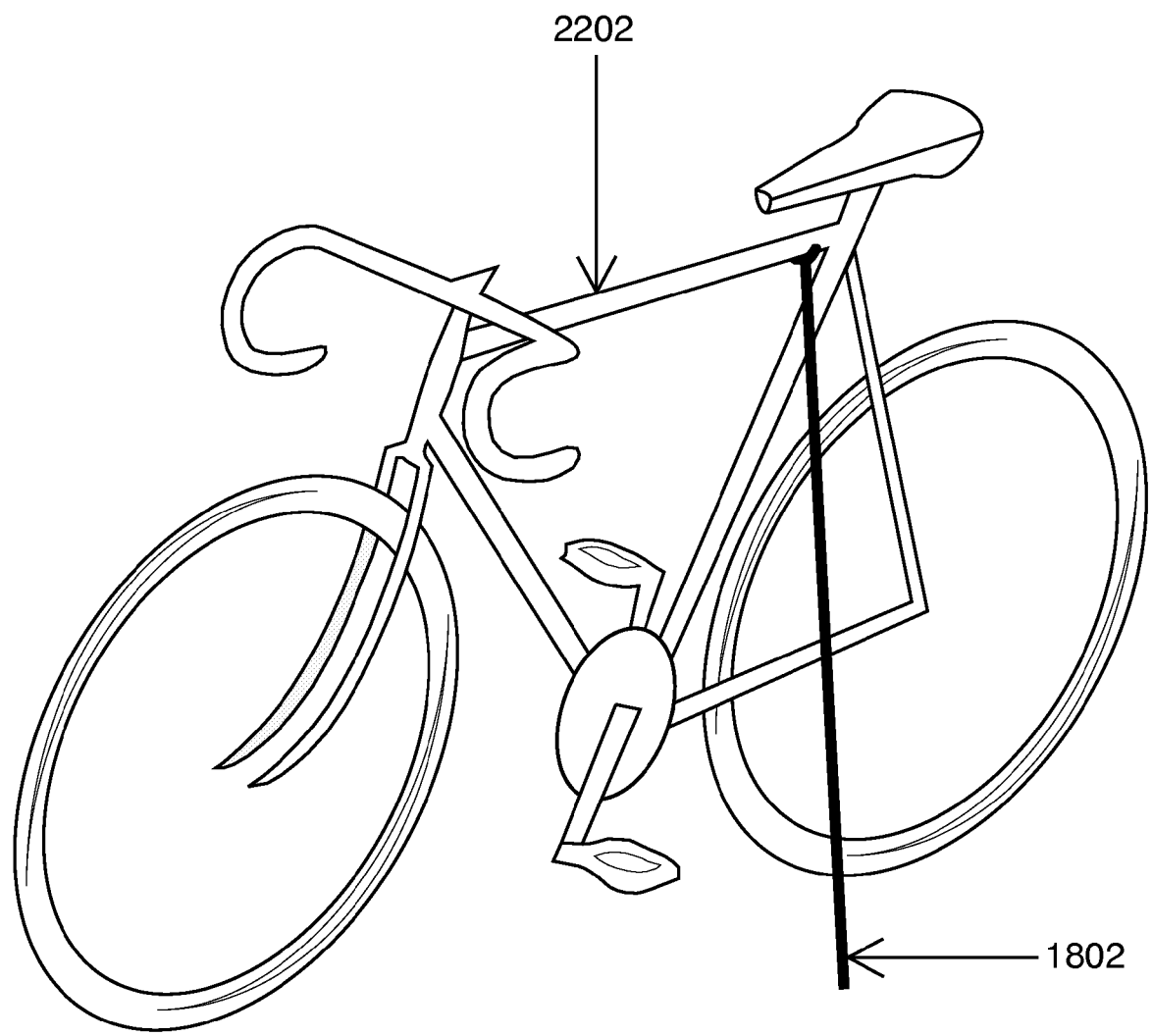
FIG. 22 is a perspective view of a stand supporting a bicycle, in accordance with an embodiment of the invention.

FIGS. 1 and 2 are side views of a collapsed stand having a stand head and stand foot, in accordance with an embodiment of the invention. In one embodiment, the stand includes the stand head 102, interlocking tubular segments 104 and 106, a stand foot 110, and an elastic cord 108. The elastic cord 108 runs through the interlocking tubular segments 104 and 106 and is coupled to the stand head 102 and the stand foot 110 on opposing ends. The stand head 102 is sized so as to slide into an internal channel of the adjacent interlocking tubular segment 104. The interlocking tubular segments 104 include a tubular section 202 and an internal sleeve 204. The internal sleeve 204 has a diameter that allows it to slide within the tubular section 202 of the adjacent interlocking tubular segment 104 or 106. The interlocking tubular segment 106 does not include an internal sleeve as the stand foot 110 is sized so as to slide into its internal channel. The interlocking tubular segments 104 are configurable to interlock to form an elongated rigid member (FIGS. 18 and 19) having the stand head 102 disposed on one end and the stand foot 110 disposed on an opposite end. The interlocking tubular segments 104 and 106 have a diameter between 0.025" and 0.433" and are fashioned from tent pole sections, such as those available from EASTON TECHNICAL PRODUCTS; although other diameters can be utilized. The stand head 102 is configurable to receive a bicycle frame and the stand foot 110 is configurable to make positive contact with a ground surface (FIG. 22). The stand head 102 and the stand foot 110 define apertures 206 and 208 within their respective bases. The elastic cord 108 is fastened to the apertures 206 and 208 and runs through internal channels of the interlocking tubular segments 104 and 106. Because the elastic cord 108 is under tension, it acts to urge the interlocking tubular segments 104 and 106 together to define an elongated rigid member (FIGS. 18 and 19). Opposing force to the tension of the elastic cord 108 can be applied to collapse the stand to a folded portable form (FIGS. 10-12).

In other embodiments, the interlocking tubular segments 104 and 106 are coupled using an alternative mechanism, such as hinges or telescoping nested segments, which may or may not include the elastic cord 108. In yet further embodiments, the interlocking tubular segments 104 and 106 are constructed from any material that is rigid and lightweight, such as carbon fiber, fiberglass, titanium, or thin wall steel. In further embodiments, the interlocking tubular segments 104 and 106 are shaped differently, such as triangular, oval, square, or some other uniform or non-uniform shape.

Figure 3A:
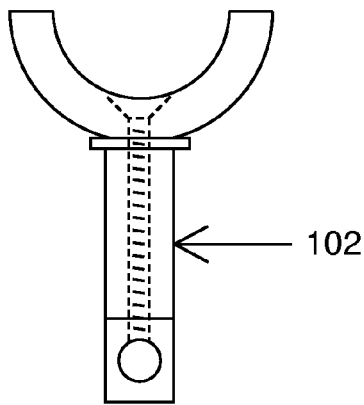
FIGS. 3a-3c are a front view, side view, and top view of a stand head, respectively, in accordance with an embodiment of the invention.
Figure 3B:
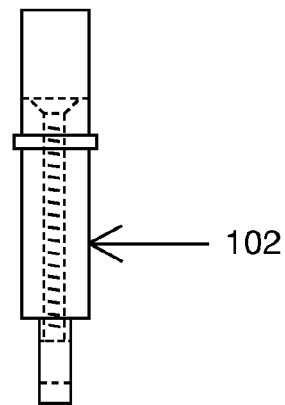
Figure 3C:
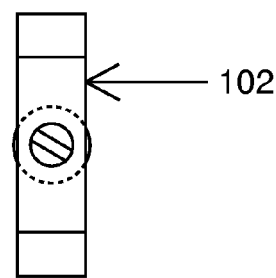
Figure 4:
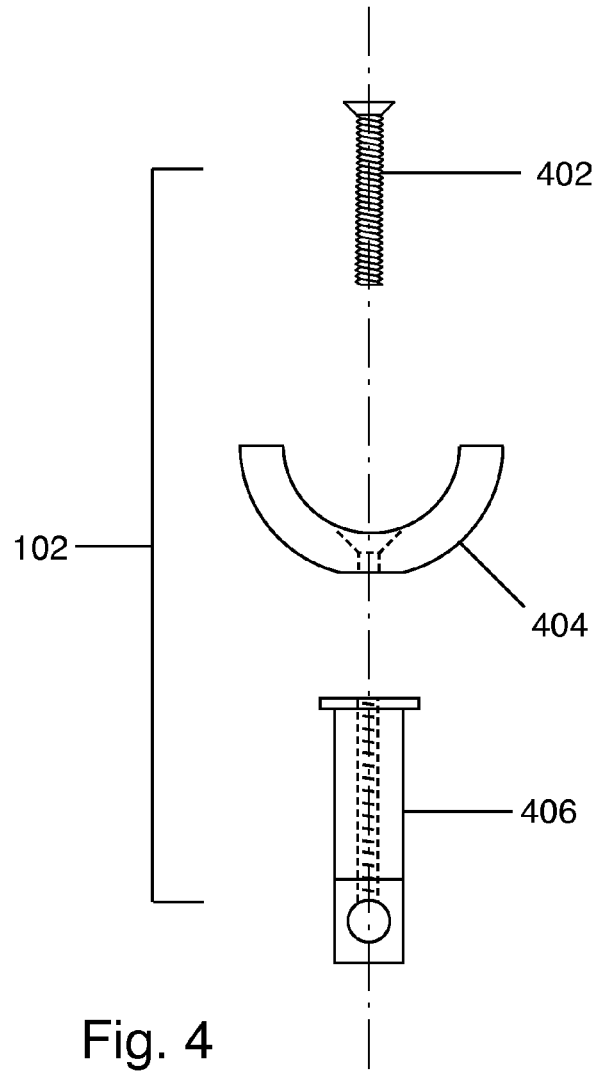
FIG. 4 is an exploded front view a stand head, in accordance with an embodiment of the invention.
Figure 20:
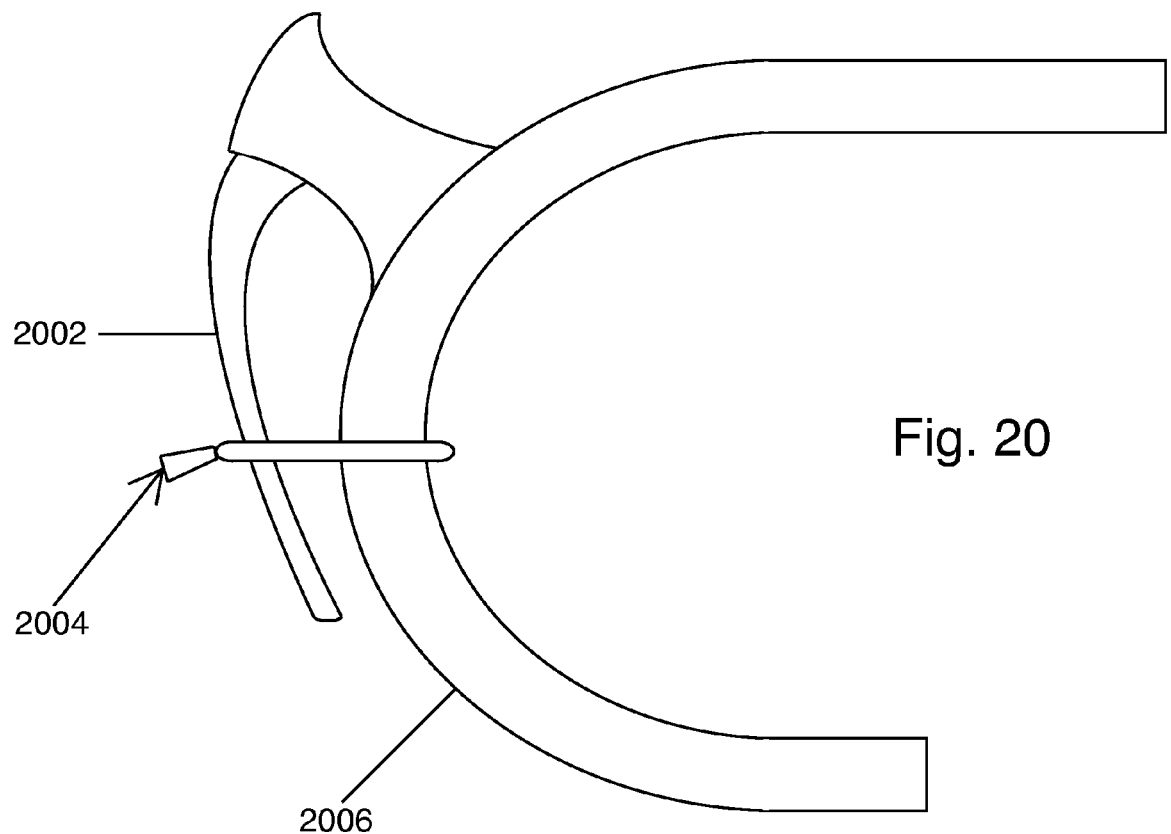
FIGS. 20-21 are side and top views of a parking brake band for securing a bicycle brake, in accordance with an embodiment of the invention.

FIGS. 3a, 3b, and 3c are a front, side, and top view, respectively, of a stand head, in accordance with an embodiment of the invention. FIG. 4 is an exploded front view a stand head, in accordance with an embodiment of the invention. The stand head 102 is configurable to being mounted to an end of the interlocking tubular segments for receiving a bicycle frame (FIG. 20). In one embodiment, the stand head 102 includes a base 406, a cradle 404, and a fastener 402. The base 406 is fashioned from an aluminum tent pole end-tip, such as that provided for by EASTON TECHNICAL PRODUCTS of Salt Lake City, Utah. The cradle 404 is fashioned from a large nylon washer, such as that available from WASHERSUSA of Black Mountain, N.C., which is cut, drilled, and countersunk. The fastener 402 couples the cradle 404 to the base 406. The stand head 102 may be alternatively constructed or shaped.

Figure 5:
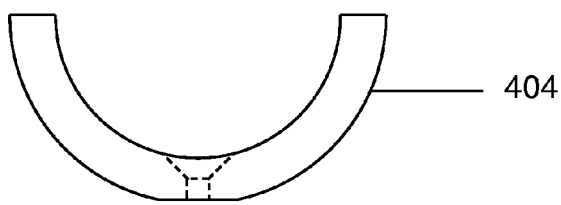
FIG. 5 are front views of various sized stand cradles for use in a stand head, in accordance with an embodiment of the invention.
Figure 5:
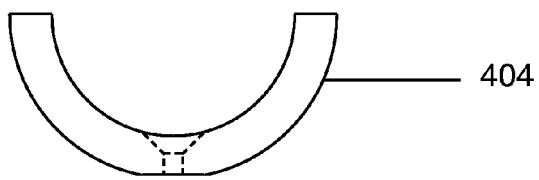
Figure 5:
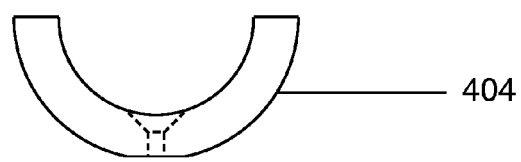

FIG. 5 are front views of various sized stand cradles for use in a stand head, in accordance with an embodiment of the invention. The preferred embodiment of the cradle 404 has an inside diameter of 1.125" to 1.625" and a width of 0.375", but other dimensions may be used.

Figure 6A:
FIGS. 6a to 6c are front views of padded stand cradles for use in a stand head, in accordance with an embodiment of the invention.
Figure 6B:
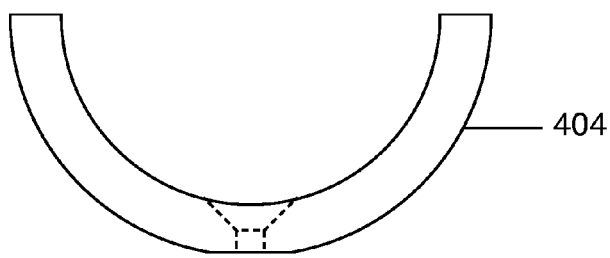
Figure 6B:
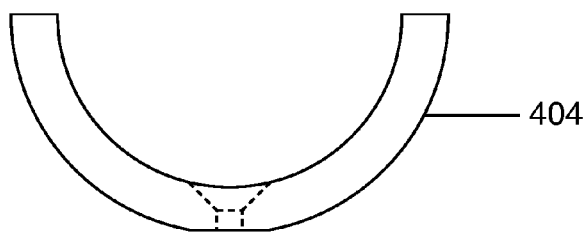
Figure 6B:
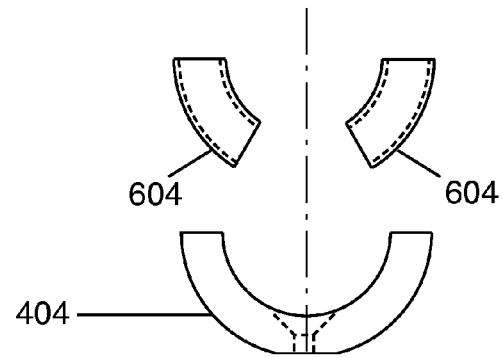
Figure 6C:
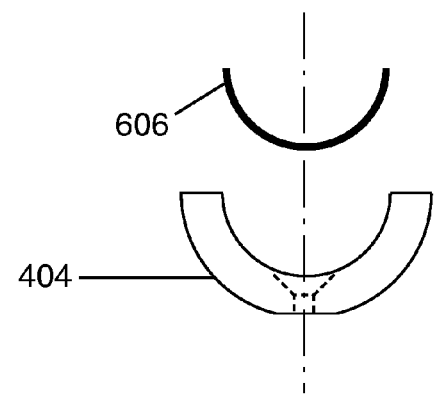

FIGS. 6a to 6c are front views of padded stand cradles for use in a stand head, in accordance with an embodiment of the invention. In one embodiment, the stand cradle 404 includes a rubber coating 602 on its surface, such as LOCTITE COLOR GUARD available from HENKEL of Düsseldorf, Germany. In another embodiment, rubber tubing 604 is disposed on ends of the stand cradle 404. In yet a further embodiment, the stand cradle 404 is lined on its inside surface with silicone foam 606, such as that available from STOCKWELL ELASTOMERICS, INC. of Philadelphia, Pa. The stand cradle 404 may be padded differently or using alternative methods.

FIGS. 7a to 7c are front views of various shaped stand heads, in accordance with an embodiment of the invention. In certain embodiments, the stand head defines shapes such as concave, V-shaped, or L-shaped. The stand head can define other alternative shapes to receive various bicycle frames. FIGS. 8a and 8b are front views of single molded stand heads, in accordance with an embodiment of the invention. In certain embodiments, the stand head is molded from a single material, such as nylon. The stand head can also be molded from different materials. FIG. 9 is a front view of a stand head with padding, in accordance with an embodiment of the invention. In one embodiment, the stand head includes a one piece head 902 having rubber tubing 904 disposed on its cradle portion for protecting a bicycle frame. The one piece head 902 can include an alternative protective coating or the protective coating can be omitted.

FIGS. 10-12 are side views of various collapsed stands, in accordance with an embodiment of the invention. In certain embodiments, the stands 1002, 1102, and 1202 include four, five, or six interlocking tubular segments, respectively, to provide for different collapsed stand lengths. The stand can include fewer or greater numbers of interlocking tubular segments.

FIGS. 13a-13c are an exploded side view, a side view, and a front view of a stand foot, respectively, in accordance with an embodiment of the invention. In one embodiment, the stand foot 110 includes a base 1302 and a tip 1304. The base 1302 is fashioned from an aluminum tent pole end, such as that provided by EASTON TECHNICAL PRODUCTS, which is drilled and tapped. The tip 1304 is a rubber screw bumper having a dome shape, such as that provided by ASTRO-TEX of Plano, Tex., which is threadable into the base 1302.

FIGS. 14a-c are an exploded side view, a side view, and of a front view of a stand foot, in accordance with an embodiment of the invention. In one embodiment, the stand foot 110 includes a base 1402 and a tip 1404. The base 1402 is fashioned from an aluminum tent pole end, such as that provided by EASTON TECHNICAL PRODUCTS, which is drilled. The tip 1404 is a rubber bumper, such as that supplied by ASTRO-TEX of Plano, Tex., which is pressed fitted into the base 1402 and secured therein, such as by using adhesive, such as LOCTITE 380 from HENKEL.

FIGS. 15a, 15b-17 are a side views of a various stand feet, in accordance with an embodiment of the invention. In alternative embodiments, the stand foot can be molded from a single material, such as nylon or aluminum. In other embodiments, the stand foot can have a different shape for interfacing with various terrains, such as a flat tip or a pointed tip. In yet another embodiment, the stand foot 110 can include a shoulder 1602 for interfacing with sand or loose soil. In a further embodiment the stand foot includes a replaceable tip 1702 that removably couples to a base 1704.

FIGS. 18 and 19 are side views of an extended stand, in accordance with an embodiment of the invention. In one embodiment, the extended stand 1802 includes an elongated rigid member having a stand head on one end for receiving a bicycle frame and a stand foot on the other end for interfacing with a ground surface. The extended stand 1802 is collapsible by separating and folding its interlocking tubular segments (FIGS. 10-12).

Figure 21:
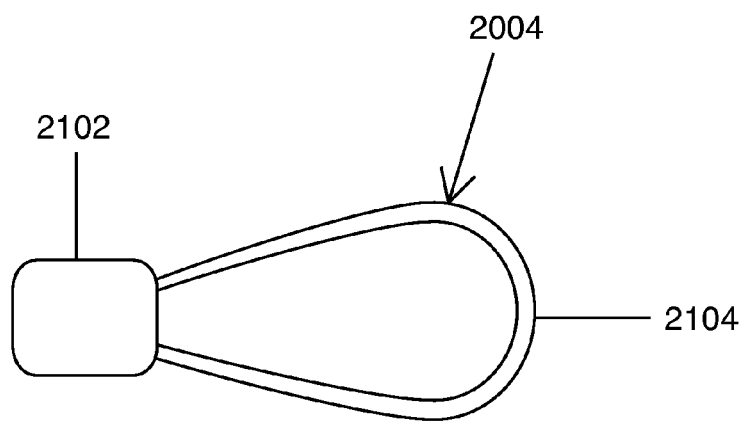

FIGS. 20-21 are side and top views of a parking brake band for securing a bicycle brake, in accordance with an embodiment of the invention. In one embodiment, a parking brake band 2004 pinches a brake lever 2002 against a handle bar 2006 of a bicycle to engage the bicycle brake. Engagement of the bicycle brake facilitates stabilized and secure use of the stand. The parking brake band 2004 is constructed from a ⅛" bungee cord 2104, which is looped and fastened at its ends using a cord lock 2102. The bungee cord 2104 can be different widths, materials, or can be alternatively fastened. Also, the parking brake band 2004 can be supplemented or replaced with an alternative securing mechanism or can be omitted.

FIG. 22 is a perspective view of a stand supporting a bicycle, in accordance with an embodiment of the invention. In one embodiment, the extended stand 1802 supports a bicycle 2202 against a ground surface using a stand head that contacts the bicycle 2202 above its center of gravity, such as where a top tube joins a seat tube, under a saddle, or where a top tube joins a head tube. Weight from the bicycle 2202 secures the extended stand 1802 in place, which in turn supports the bicycle 2202. With a little adaptation some unusually configured bicycles can make use of the stand, such as recumbent and step-through bicycles, tandems, and triplets. Also, objects other than bicycles that need to be supported can use this stand, such as a backpack fishing pole or a camera monopod.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

I claim:

1. A stand system for supporting a bicycle in a stationary position comprising:
   a plurality of separable segments tensionally biased to define an elongated member having an internal channel;
   an interchangeable stand cradle positioned at one end of the elongated member;
   a stand foot positioned at another end of the elongated member; and
   a parking brake band independent from the plurality of separable segments and configured to secure a bicycle brake in an engaged position.

2. The stand system of claim 1, wherein the plurality of separable segments are removably interlockable.

3. The stand system of claim 1, wherein the plurality of separable segments are tensionally biased by an elastic cord.

4. The stand system of claim 1, wherein the plurality of separable segments are composed of aluminium.

5. The stand system of claim 1, wherein the plurality of separable segments have a diameter of between 0.025 inches and 0.433 inches.

6. The stand system of claim 1, wherein the plurality of separable segments are interlockable in any rotational alignment.

7. The stand system of claim 1, wherein the stand cradle has a concave recess.

8. The stand system of claim 1, wherein the stand cradle has a diameter of between 1.125 inches and 1.625 inches.

9. The stand system of claim 1, wherein the stand cradle is rotatable about a longitudinal center axis of the elongated member.

10. The stand system of claim 1, wherein the stand cradle has a rubber coating.

11. The stand system of claim 1, wherein the stand cradle is lined at least partially with foam.

12. The stand system of claim 1, wherein the stand foot includes a rounded post.

13. The stand system of claim 1, wherein the stand foot includes a shoulder.

14. The stand system of claim 1, wherein the stand food is interchangeable.

15. The stand system of claim 1, wherein the stand foot is rotatable about a longitudinal center axis of the elongated member.

16. A stand system for supporting a bicycle in a stationary position comprising:
   a plurality of separable segments tensionally biased to define an elongate member having an internal channel;
   a stand cradle positioned at one end of the elongated member;
   an interchangeable stand foot positioned at another end of the elongated member; and
   a parking brake band independent from the plurality of separable segments and configured to secure a bicycle brake in an engaged position.

* * * * *